(12) United States Patent
Kim (10) Patent No.: US 7,517,607 B2
(45) Date of Patent: Apr. 14, 2009

(54) LITHIUM ION SECONDARY BATTERY

(75) Inventor: Jun Ho Kim, Cheonan-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 681 days.

(21) Appl. No.: 10/965,734

(22) Filed: Oct. 18, 2004

(65) Prior Publication Data

US 2005/0181272 A1    Aug. 18, 2005

(30) Foreign Application Priority Data

Oct. 20, 2003  (KR) .................. 10-2003-0072928

(51) Int. Cl.
*H01M 2/12* (2006.01)
(52) U.S. Cl. .............. 429/56; 429/82; 429/175
(58) Field of Classification Search ............ 429/53,
429/56, 82, 175, 176; 137/68.19, 68.23,
137/68.24; 220/203.01, 203.08, 203.29,
220/580; 383/100; 215/307, 902; 49/471
See application file for complete search history.

(56) References Cited

U.S. PATENT DOCUMENTS

| | | | | |
|---|---|---|---|---|
| 4,175,166 A | * | 11/1979 | Rosansky | 429/56 |
| 4,789,608 A | * | 12/1988 | Oswald | 429/56 |
| 4,803,136 A | * | 2/1989 | Bowsky et al. | 429/56 |
| 6,159,631 A | * | 12/2000 | Thompson et al. | 429/56 X |
| 6,432,572 B1 | * | 8/2002 | Yoshida et al. | 429/56 |
| 6,472,096 B2 | * | 10/2002 | Park et al. | 429/56 X |
| 6,964,690 B2 | * | 11/2005 | Goda et al. | 429/56 X |
| 7,308,903 B2 | * | 12/2007 | Rooker et al. | 137/68.29 |
| 2006/0199046 A1 | * | 9/2006 | Dewulf et al. | 429/7 |
| 2008/0182159 A1 | * | 7/2008 | Mitani et al. | 429/56 |

FOREIGN PATENT DOCUMENTS

| | | | |
|---|---|---|---|
| CN | 2529389 Y | | 1/2003 |
| JP | 10-156443 | * | 6/1998 |
| JP | 10-261391 | | 9/1998 |
| JP | 11-111241 | | 4/1999 |
| JP | 2001-23595 | | 1/2001 |
| JP | 2001-126693 | | 5/2001 |
| JP | 2002-175789 | | 6/2002 |

OTHER PUBLICATIONS

Chinese Examination Report issued on Jan. 19, 2007 by the Chinese Patent Office for Chinese Patent Application No. 200410056956.X.

* cited by examiner

*Primary Examiner*—Stephen J. Kalafut
(74) *Attorney, Agent, or Firm*—Stein, McEwen & Bui, LLP

(57) ABSTRACT

A lithium ion secondary battery in which a safety vent as a safety device for a swelling phenomenon functions under a low pressure. A notch is formed in an inner surface of a large-area wall of the secondary battery, and an auxiliary notch is formed in an outer surface to correspond to the notch formed in the inner surface.

11 Claims, 12 Drawing Sheets

FIG. 3D

LITHIUM ION SECONDARY BATTERY

CROSS-REFERENCE TO RELATED APPLICATIONS

This application claims the priority of Korean Patent Application No. 2003-72928, filed on Oct. 20, 2003, in the Korean Intellectual Property Office, the disclosure of which is incorporated herein in its entirety by reference.

BACKGROUND OF THE INVENTION

1. Field of the Invention

The present invention relates to a lithium ion secondary battery, and more specifically, to a lithium ion secondary battery having a polygonal section, which can enhance safety and reliability thereof by allowing a safety vent to be easily destroyed under a low pressure.

2. Description of the Related Art

In general, a lithium ion secondary battery having a diagonal section comprises an electrode assembly formed by a positive electrode plate, which is wound into a jelly roll shape and to which a positive electrode active material is attached, a negative electrode plate to which a negative electrode active material is attached, and an isolation film which is positioned between the positive electrode plate and the negative electrode plate, to prevent a short-circuit and to enable only movement of lithium ions; a can to which the electrode assembly is coupled; a cap assembly which closes the can and prevents the electrode assembly from being detached from the can; and an electrolyte which is injected into the can and allows lithium ions to be moved in the can.

In order to form the lithium ion secondary battery, first, the positive electrode plate to which the positive electrode active material is attached, the negative electrode plate to which the negative electrode active material is attached and the isolation film are stacked. This stacked structure is wound up in a jelly roll shape, and is put into the can having a diagonal section through an opening of the can. Thereafter, the cap assembly is welded to the opening of the can. Then, the electrolyte is injected into the can through an inlet of the cap assembly, and then the inlet is closely sealed. A bare cell is completed through a formation process of carrying out charge and discharge several times. Subsequently, a protection circuit is attached to the bare cell, and then assembly and inspection processes are carried out, thereby completing a conventional battery pack.

On the other hand, since the lithium ion secondary battery employs a constant potential current regulated charge method, an over-charge phenomenon is not generated only if a charge voltage of a charger is accurately controlled. However, an abnormal charge may occur due to destruction or erroneous operation of the charger. In this case, since the positive electrode active material such as lithium cobalt oxide ($LiCoO_2$) has a characteristic that the potential is continuously increased, a cell voltage is continuously increased, and thus an abnormal heat emission phenomenon occurs.

Safety measures for such phenomenon include a measure of having a PTC (Positive Temperature Coefficient) element built-in, a measure of adopting an isolation film having a shut-down operation, etc. In addition, as the safety measure, there is a safety vent working by means of generation of gases. Here, the safety vent of the lithium ion secondary battery having a diagonal section indicates a portion usually formed with a thin thickness by forming a notch on a bottom surface of the can or an outer surface of the cap assembly, and the safety vent is destroyed in a case where a swelling phenomenon is severely advanced due to generation of gases, thereby venting the gases.

The gases are generated because the lithium carbonate $Li_2CO_3$ that is used for the formation of the positive electrode active material such as lithium cobalt oxide $LiCoO_2$ is added excessively over the Stoichiometry. The excessively added lithium carbonate remains in the lithium cobalt oxide $LiCoO_2$ as the positive electrode active material in a non-reaction state. Then, the lithium carbonate $Li_2CO_3$ is decomposed when a voltage of the battery is increased and heat is generated due to the abnormal charge, thereby generating carbon oxide gas. The swelling phenomenon where the can is excessively expanded results from generation of the carbon oxide gas, and when the swelling phenomenon is severely advanced, the safety vent operates.

The swelling phenomenon may be solved by adding a small amount of lithium carbonate, but in this case, the cobalt oxide $CoO_2$ remains in the positive electrode active material. Cobalt is eluted into the electrolyte during charging due to the remaining cobalt oxide, and the eluted cobalt agglomerates at the surface of the negative electrode, thereby causing an internal short-circuit, which is more dangerous. Therefore, the lithium carbonate should be excessively added in preparing the positive electrode active material.

Due to the swelling phenomenon, a wide plane of the can is expanded outwardly, and the other four narrow planes are bent outwardly at both ends thereof and are contracted inwardly at the central portions thereof.

Conventionally, the safety vent is formed by forming a notch on a wide plane or on a bottom plane of the can or on an outer surface of the cap assembly by using a pressing method, and when the swelling phenomenon occurs, the safety vent operates.

However, if the notch is formed on the outer surface of the wide plane of the can, where a large tensile stress is applied, the notch lessens the tensile stress imposed at the part when the wide plane expands outwardly.

As a result, from the viewpoint of rigid body mechanics, the safety vent cannot be destroyed properly with a desired pressure but may be destroyed with a very high pressure. Thus, there is a problem that safety of the battery is much deteriorated.

Therefore, a pressing method of forming the notch of the safety vent in a large depth has been developed, but this method has a problem that the safety vent is destroyed with various pressures. As a result, this safety vent provides poor reproducibility and thus the reliability is deteriorated.

SUMMARY OF THE INVENTION

Accordingly, an aspect of the present invention provides a lithium ion secondary battery having a polygonal section, which can enhance safety and reliability thereof by allowing a safety vent to be easily destroyed under a desired low pressure.

Thus, the present invention provides a lithium ion secondary battery comprising: an electrode assembly formed by winding up a positive electrode plate, a negative electrode plate and an isolation film; a can having: a pair of first walls having a plate shape, which are separated from each other by a predetermined distance, at least one or more notches for a safety vent being formed on an inner surface of the pair of first walls in contact with the electrode assembly; a pair of second walls having a plate shape, which have an area less than that of the pair of first walls and which connect with two longitudinal sides of the pair of first walls; a third wall having a plate shape, which has an area less than that of the pair of second walls and which is connected to both of the pair of first walls and the pair of second walls; and an opening which is provided to be opposed to the third wall and which allows the electrode assembly to be coupled thereto; a cap assembly welded to the pair of first walls and the pair of second walls of the can to close the opening and to prevent the electrode assembly from being detached from the can; and an electrolyte injected into the can.

Here, an auxiliary notch having a predetermined depth may be further formed at a position of an outer surface corresponding to the notch formed in the inner surface of the pair of first walls.

Further, the notch may be formed in a predetermined depth by pressing the inner surface of the pair of first walls, and the notch may have a first slant surface and a second slant surface forming a predetermined angle.

Furthermore, the auxiliary notch may be formed by pressing the outer surface of the pair of first walls, and the auxiliary notch may have a first slant surface and a second slant surface forming a predetermined angle.

Furthermore, the notch may have a depth which is greater than that of the auxiliary notch.

Furthermore, in another aspect of the invention the notch has a line shape parallel to a longitudinal side of the third wall of the can.

Furthermore, in another aspect of the invention, the notch has a length corresponding to 50% through 90% of a length of the longitudinal side of the third wall.

Furthermore, the notch may have a line shape parallel to a longitudinal side of the pair of second walls of the can.

Furthermore, the notch may have a length corresponding to 50% through 90% of a length of the longitudinal side of the pair of second walls.

Furthermore, the notch may have a line shape which is bent one or more times to have both of a portion extending in a longitudinal direction of the pair of second walls and a portion extending in a longitudinal direction of the third wall.

The present invention also provides a lithium ion secondary battery comprising: an electrode assembly formed by winding up a positive electrode plate, a negative electrode plate and an isolation film; a can having: a pair of first walls having a plate shape, which are separated from each other by a predetermined distance; a pair of second walls having a plate shape, which have an area less than that of the pair of first walls and which connect two longitudinal sides of the pair of first walls; a third wall having a plate shape, which has an area less than that of the pair of second walls and which is connected to both of the pair of first walls and the pair of second walls; and an opening which is provided to be opposed to the third wall and which allows the electrode assembly to be coupled thereto; a cap assembly welded to the pair of first walls and the pair of second walls, which closes the opening of the can and which prevents the electrode assembly from being detached from the can; an electrolyte injected into the can, in the lithium ion secondary battery, and a safety vent, obtained by forming a notch and an auxiliary notch on an inner surface and an outer surface of at least one of the pair of first walls and the pair of second walls, the third wall and the cap plate, respectively.

Here, a surface which is in contact with the electrode assembly or the electrolyte in the secondary battery in which the electrode assembly is built in is defined as the inner surface, and a surface which is in contact with an external air is defined as the outer surface.

Further, the notch may be formed in a predetermined depth by pressing the inner surface of the cap plate, and the notch may have a first slant surface and a second slant surface forming a predetermined angle.

Furthermore, the auxiliary notch may be formed in a predetermined depth by pressing the outer surface, and the auxiliary notch may have a first slant surface and a second slant surface forming a predetermined angle.

Furthermore, the notch may have a depth less than that of the auxiliary notch. Here, a shallow auxiliary notch or notch is formed on a wall side toward which the walls of the secondary battery are bent, and a deep notch or auxiliary notch is formed on the other wall side.

As is described above, in the lithium ion secondary battery according to the present invention, by forming the notch of a safety vent on the inner surface of the first wall, which expands externally due to generation of the swelling phenomenon, the safety vent is easily destroyed under a low pressure. That is, since the notch, constituting the safety vent, is formed on the inner surface such that a thin wall portion remains only on the outer surface of the first walls to which a large tensile stress is applied in generation of the swelling phenomenon, the thin wall portion is most easily destroyed on the basis of mechanics of rigid body.

In addition, by further forming the auxiliary notch on the outer surface in addition to the notch formed on the inner surface to form a discontinuous point, the safety vent works more easily under a low pressure. That is, in a condition that the safety vent may be easily destroyed under a low pressure due to the notch formed on the inner surface, since the auxiliary notch is further formed in a portion of the outer surface corresponding to the notch, the stress is concentrated on the safety vent, and thus the safety vent is destroyed more easily.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1A:
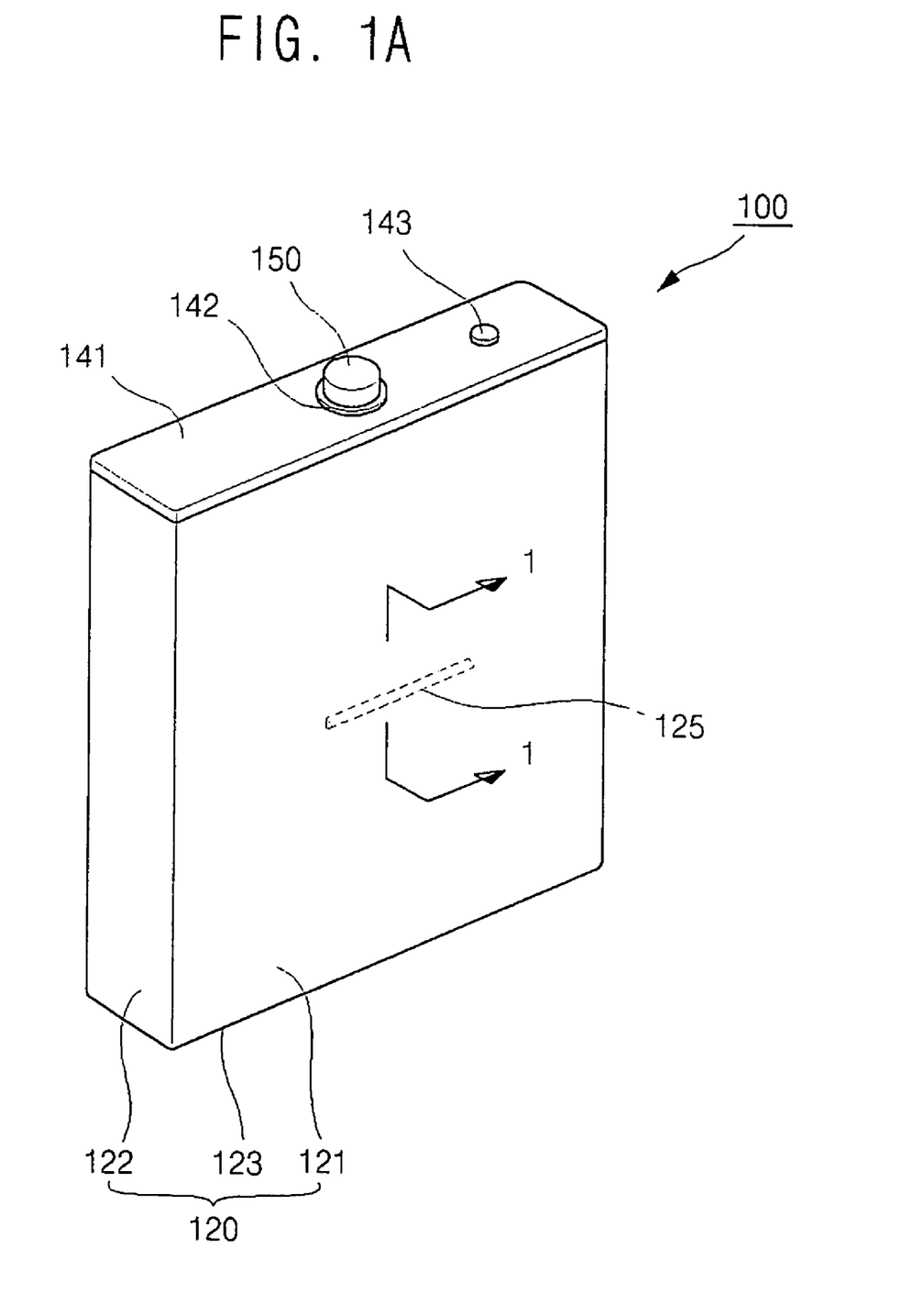
FIG. 1A is a perspective view illustrating a lithium ion secondary battery according to an embodiment of the present invention, where a notch is formed in an inner surface of a maximum-area wall.
Figure 1B:
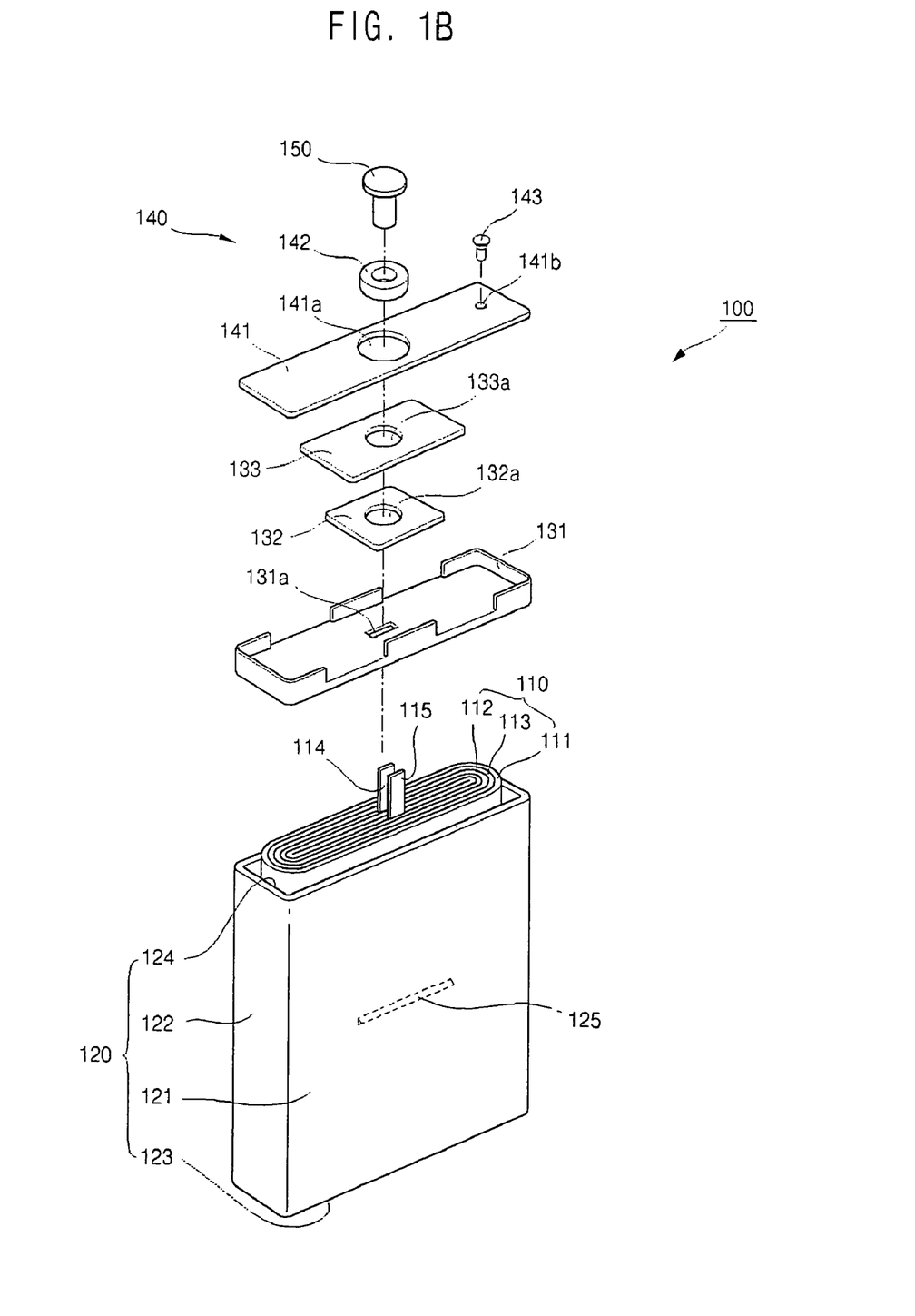
FIG. 1B is an exploded perspective view of the lithium ion secondary battery shown in FIG. 1A.
Figure 1C:
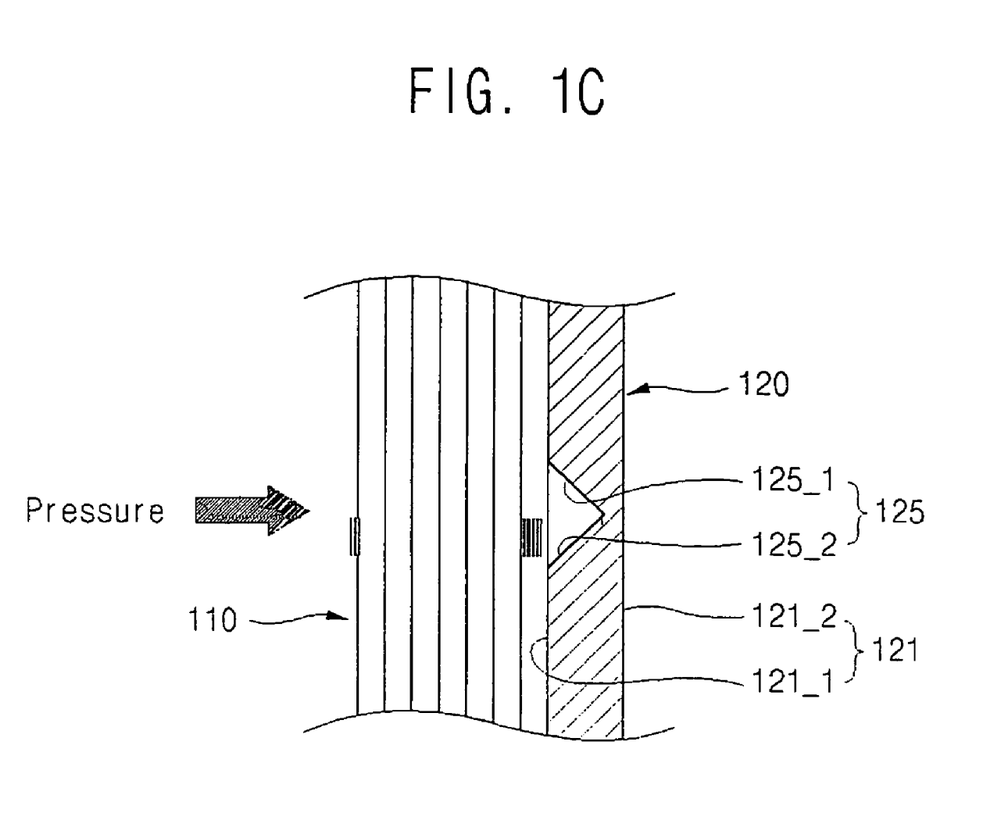
FIG. 1C is a cross-sectional view taken along a line 1-1 of FIG. 1A.
Figure 1D:
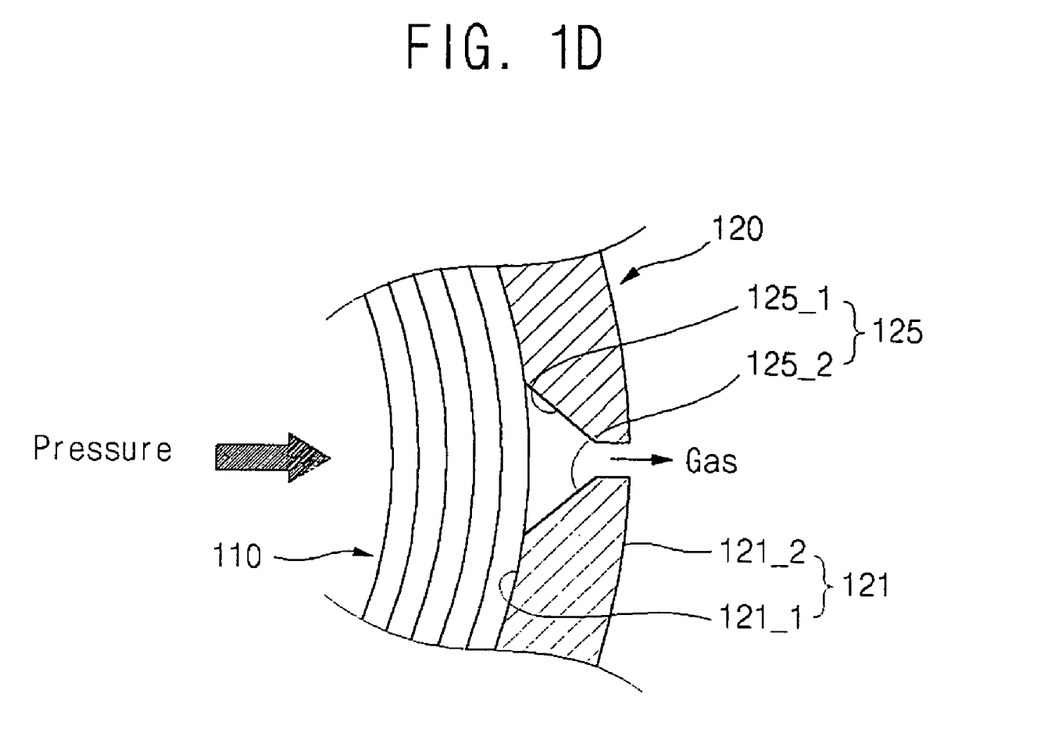
FIG. 1D is a cross-sectional view illustrating a state where a safety vent of a can is destroyed.

FIG. 1A is a perspective view illustrating a lithium ion secondary battery 100 according to an embodiment of the present invention, FIG. 1B is an exploded perspective view of the lithium ion secondary battery shown in FIG. 1A, FIG. 1C is a cross-sectional view taken along a line 1-1 of FIG. 1A, and FIG. 1D is a cross-sectional view illustrating a state where a safety vent of a can is destroyed.

As shown in the figures, the lithium ion secondary battery according to the present invention comprises an electrode assembly 110 to generate a potential difference, a can 120 having a rectangular parallelepiped shape to receive the electrode assembly 110, a cap assembly 140 coupled to a top portion of the can 120 to prevent the electrode assembly 110 from being detached from the can, and an electrolyte (not shown) injected into the can 120 to allow ions to be moved in the electrode assembly.

The electrode assembly 110 comprises a positive electrode plate 111 to which a positive electrode active material (for example, lithium cobalt oxide $LiCoO_2$; not shown) is attached, a negative electrode plate 112 to which a negative electrode active material (for example, graphite; not shown) is attached, and an isolation film 113, which is positioned between the positive electrode plate 111 and the negative electrode plate 112, to prevent a short-circuit and to allow only movement of lithium ions. The positive electrode plate 111, the negative electrode plate 112 and the isolation film 113 are wound up in a jelly roll shape, and are received in the can 120. Here, the positive electrode plate 111 may be an aluminum (Al) foil, the negative electrode plate 112 may be a copper (Cu) foil, and the isolation film may be made of polyethylene (PE) or polypropylene (PP), but the present invention is not limited to the above materials. A positive electrode lead 114, projected upwardly with a predetermined length, is welded to the positive electrode plate 111, and a negative electrode lead 115 projected upwardly with a predetermined length is welded to the negative electrode plate 112. The positive electrode lead 114 may be made of aluminum (Al), and the negative electrode lead 115 may be made of nickel (Ni), but the present invention is not limited to the above materials.

As shown in FIG. 1C, the can 120 has a pair of first walls 121, each of which having a plate shape, which are separated from each other by a predetermined distance, and at least one or more notch 125 is formed on an inner surface 121_1 of the pair of first walls being in contact with the electrode assembly 110.

Further, the can 120 has a pair of second walls 122 having a plate shape, which have an area less than that of the pair of first walls 121 and which connect two longitudinal sides of the pair of first walls 121. The can 120 has a third wall 123 having a plate shape, which has an area less than that of the pair of second walls 122 and is connected to both of the pair of first walls 121 and the pair of second walls 122. An opening 124, which is provided to be opposed to the third wall 123, allows the electrode assembly 110 to be coupled to the can 120.

Here, the notch 125 is formed by pressing the inner surface 121_1 of the pair of first walls 121 in contact with the electrode assembly 110 toward an outer surface 121_2 with a predetermined depth. Therefore, in the safety vent including the notch, the pair of first walls 121 of the can 120 remains on the outer surface 121_2 side of the pair of first walls 121 with a smallest thickness. Furthermore, the notch 125 has a first slant surface 125_1 and a second slant surface 125_2 forming a predetermined angle, and the first slant surface 125_1 and the second slant surface 125_2 form substantially two sides of a triangle in a sectional view.

The notch 125 has substantially a line shape parallel to a longitudinal side of the third wall 123 of the can 120. In an embodiment of the invention, the notch 125 has a length corresponding to 50% through 90% of a length of the longitudinal side of the third wall 123, but the present invention is not limited to the length. Although not shown, the notch 125 may have substantially a line shape parallel to a longitudinal side of the pair of second walls 122 of the can 120. In another embodiment of the invention, the notch 125 has a length corresponding to 50% through 90% of a length of the longitudinal side of the pair of second walls 122, but the present invention is not limited to the length. Furthermore, the notch 125 may have a line shape, for example, an "L" shape, which is bent one or more times such that a portion of the notch is parallel to the longitudinal side of the pair of second walls 122 and another portion of the notch is parallel to the longitudinal side of the third wall 123. However, the shape of the notch 125 of the present invention is not limited to the line shape or the bent line shape, but may include various bent shapes and curved shapes.

The can 120 may be made of various materials including, but not limited to, aluminum (Al), steel (Fe), or other alloys. In addition, since the positive electrode lead 114 is welded to the can 120, the can 120 itself operates as a positive electrode.

An insulating case 131, a terminal plate 132 and an insulating plate 133 may be sequentially coupled to a top portion of the electrode assembly 110, that is, a top portion of the can 120, but these elements are not indispensable to the present invention. Through holes 131a, 132a, 133a are formed in the insulating case 131, the terminal plate 132 and the insulating plate 133, respectively, so that a negative electrode terminal 150 extends upwardly to pass through the above elements.

As shown in FIG. 1B, the cap assembly 140 is laser-welded to the can 120. The cap assembly 140 comprises a cap plate 141 having a plate shape. A through hole 141a having a predetermined size is formed at the center of the cap plate 141. An electrolyte inlet 141b, through which the electrolyte is injected, is formed at one side of the cap plate 141. An insulating gasket 142 is coupled to the through hole 141a of the cap plate 141, and the negative electrode terminal 150 is coupled to the insulating gasket 142. The negative electrode terminal 150 is welded to the negative electrode lead 115, and functions as a negative electrode during charge and discharge. A plug 143 is coupled to the electrolyte inlet 141b of the cap plate 141 to allow the electrolyte not to be leaked externally after injection of the electrolyte.

On the other hand, the electrolyte, not shown, functions as a movement medium of lithium ions generated from electrochemical reactions in the positive electrode and the negative electrode during the charge and discharge of the battery. The electrolyte may be a non-aqueous organic electrolyte which is a mixture of a lithium salt and a high-purity organic solvent. In addition, the electrolyte may be a polymer using a polyelectrolyte.

As shown in FIG. 1D, the safety vent 125 is easily destroyed outwardly under a low pressure as a result of the swelling phenomenon. This is because when the notch 125 is directly formed on the inner surface 121_1 of the first wall 121 of the can 120, the wall portion has only a small thickness in the outermost side to which a large tensile stress is applied. This portion is most easily destroyed mechanically. Therefore, according to the present invention, the safety and the reliability of the lithium ion battery 100 can be maximized.

Figure 2A:
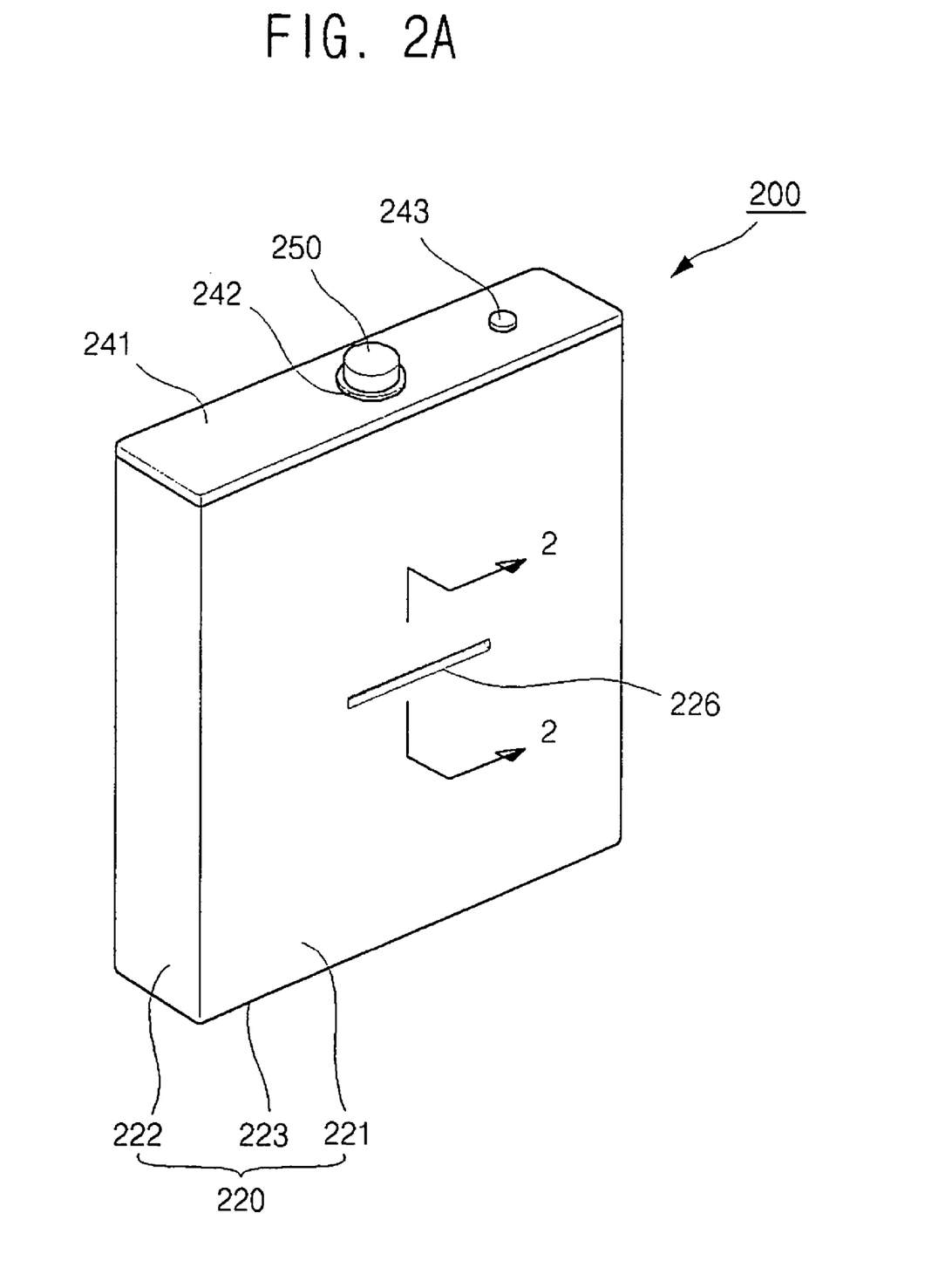
FIG. 2A is a perspective view illustrating a lithium ion secondary battery according another embodiment of the present invention, where an auxiliary notch is formed.
Figure 2B:
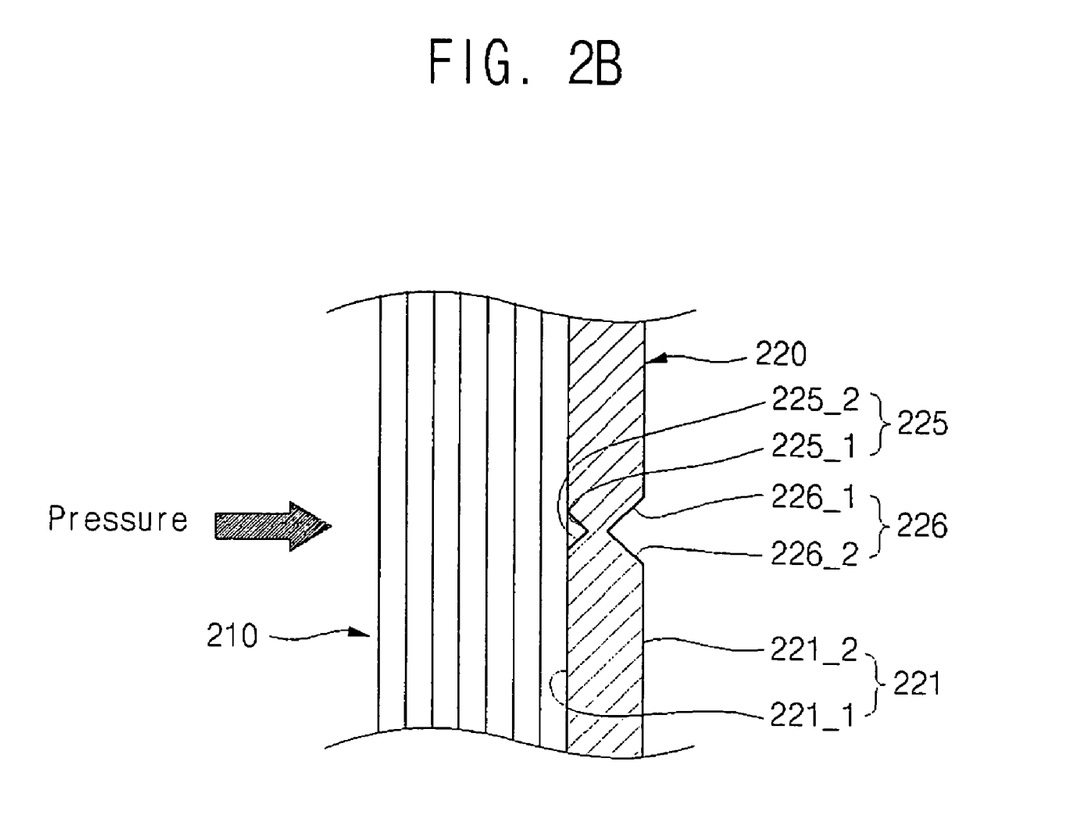
FIG. 2B is a cross-sectional view taken along a line 2-2 of FIG. 2A.
Figure 2C:
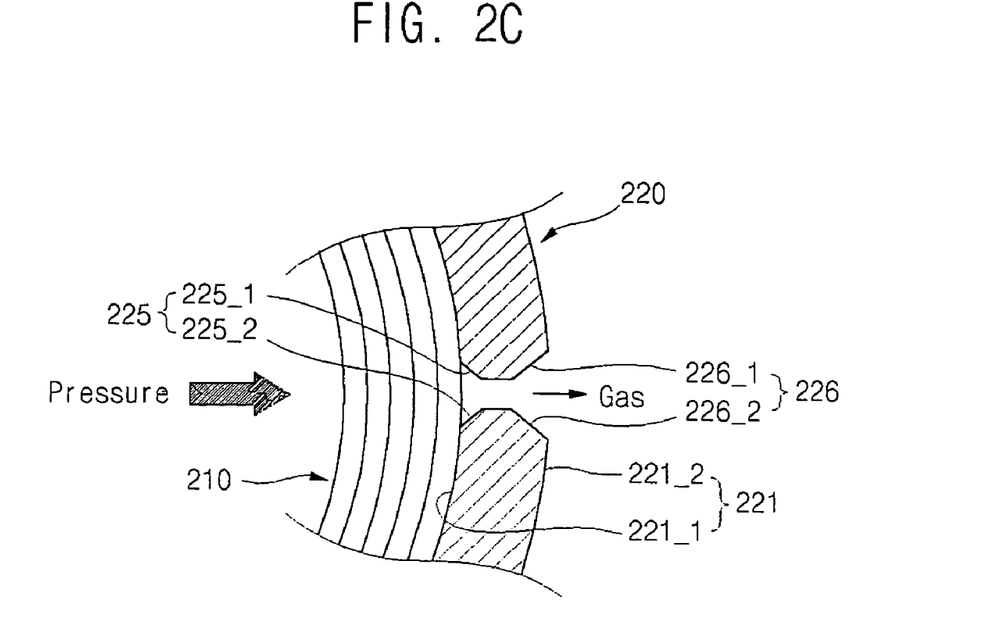
FIG. 2C is a cross-sectional view illustrating a state where a can is destroyed.

FIG. 2A is a perspective view illustrating a lithium ion secondary battery 200 according another embodiment of the present invention, FIG. 2B is a cross-sectional view taken along a line 2-2 of FIG. 2A, and FIG. 2C is a cross-sectional view illustrating a state where a can 220 is destroyed. Here, the lithium ion secondary battery 200 according to another embodiment of the present invention has a configuration similar to that of the aforementioned lithium ion secondary battery 100, and thus differences thereof will be emphasized.

Figure 2D:
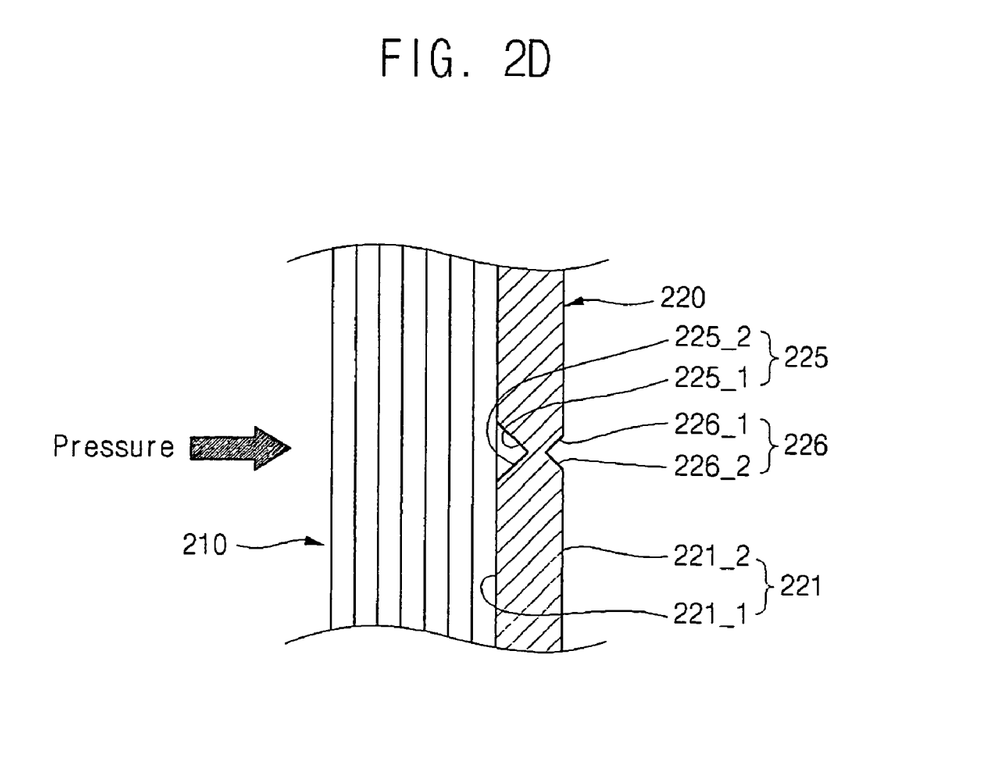
FIG. 2D is a partial cross-sectional view illustrating a safety vent in which the notch is larger than the auxiliary notch.

As shown in the figures, in the lithium ion secondary battery 200 according to this embodiment of the present invention, an auxiliary notch 226 having a predetermined depth is further formed on a portion of the outer surface 221_2 corresponding to the notch 225 formed on the inner surface 221_1 of the first wall 221 of the can 220. As shown in FIGS. 2A and 2B, the lithium ion secondary battery 200 includes an electrode assembly 210, a cap plate 241. a gasket 241, a plug 243, and a negative electrode terminal 250. The notch 225 has a first slant surface 225 1 and a second slant surface 225 2 forming a predetermined angle. The auxiliary notch 226 includes a first slant surface 226_1 and a second slant surface 226_2 forming a predetermined angle. The auxiliary notch 226 formed on the outer surface 221_2 of the first wall 221 has a depth larger than that of the notch 225 formed on the inner surface 221_1 of the first wall 221. Of course, as shown in FIG. 2D, the depth of the notch 225 may be larger than or equal to that of the auxiliary notch 226. However, the scope of the present invention is not limited to such a depth.

Figure 2E:
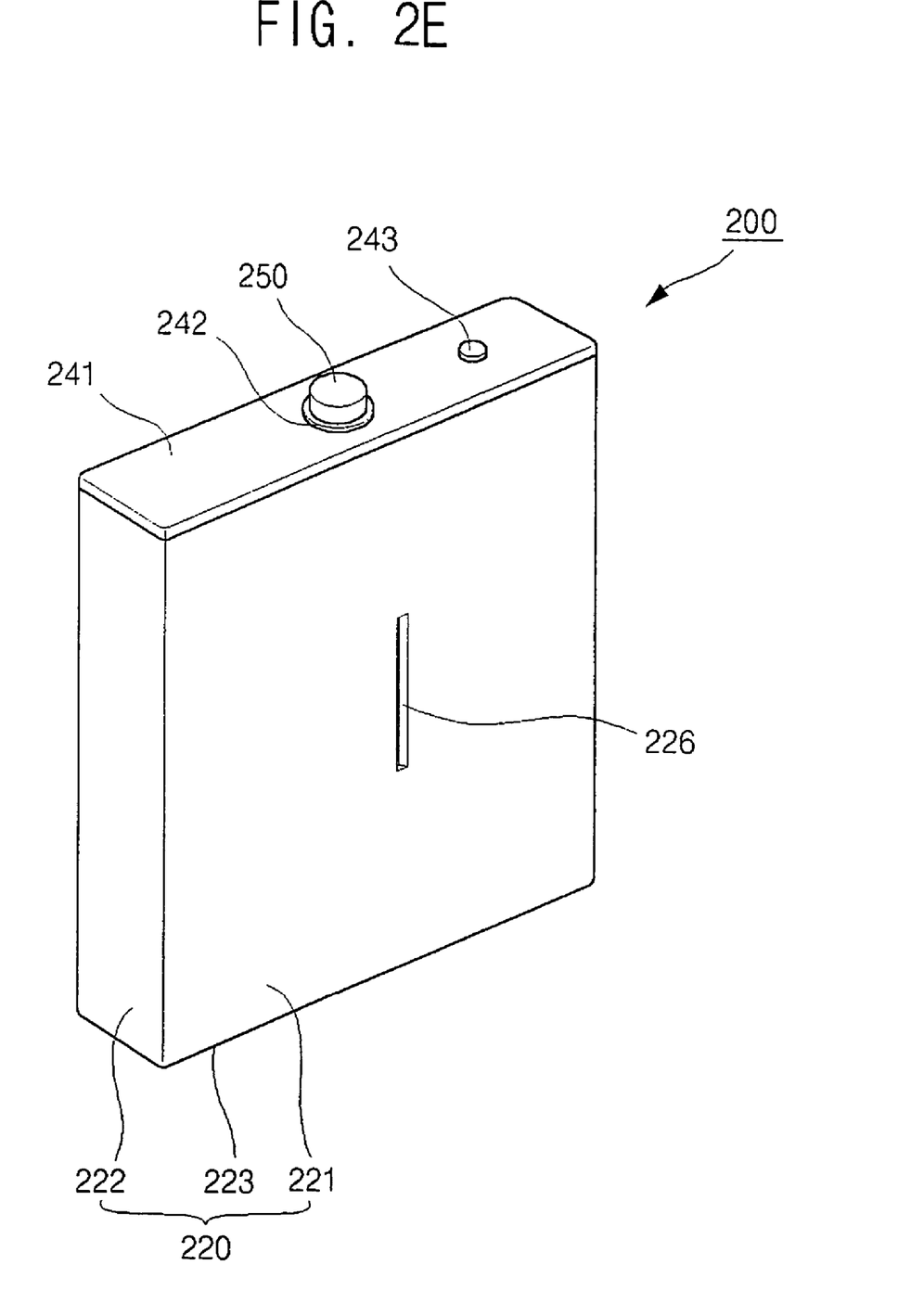
FIGS. 2E and 2F are perspective views illustrating other embodiments of the present invention, where the auxiliary notch is formed.
Figure 2F:
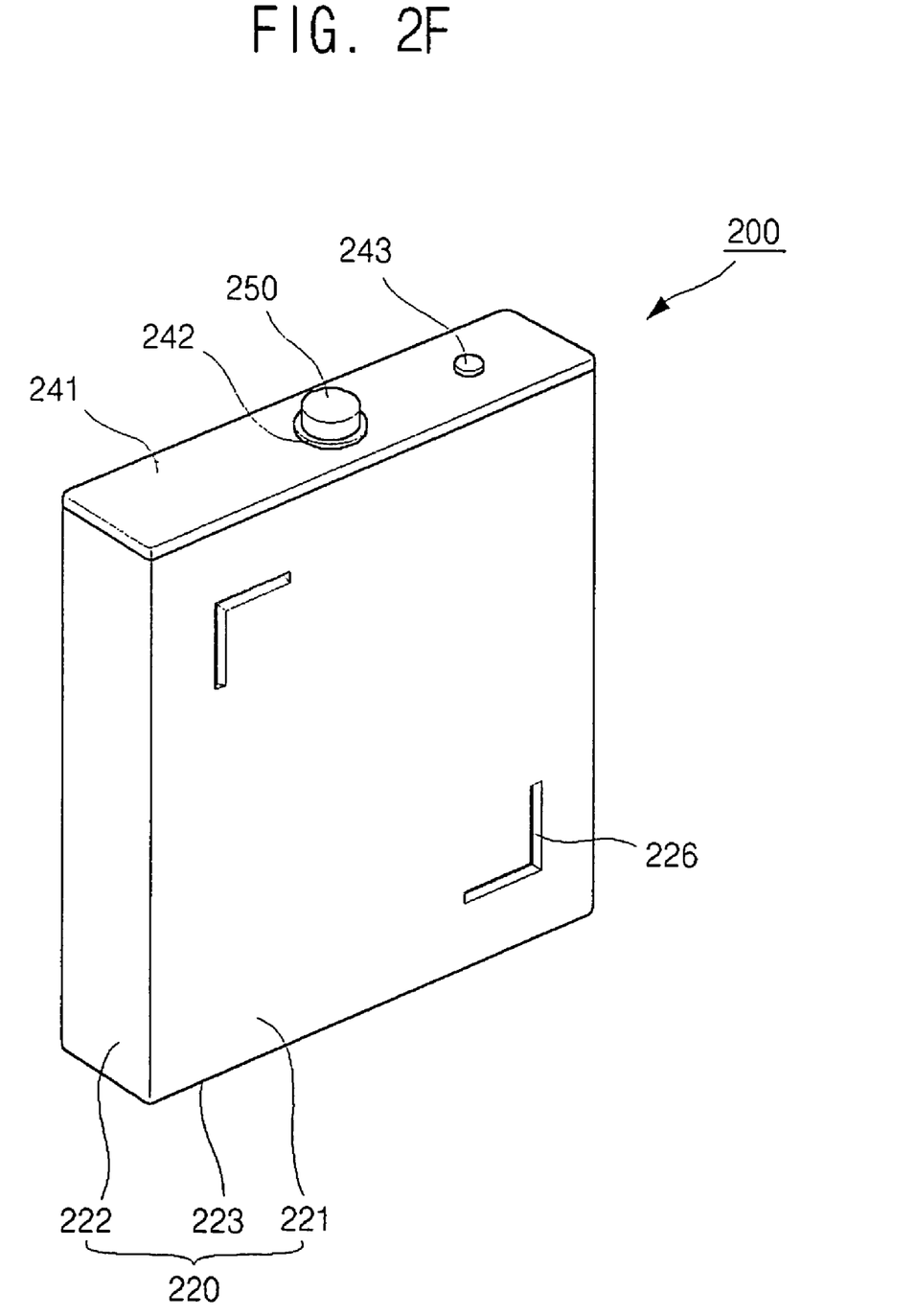

The notch 225 and the auxiliary notch 226 have a line shape, respectively, and are each substantially parallel to the longitudinal side of the third wall 223 of the can 220. Further, as shown in FIG. 2E, the notch 225 and the auxiliary notch 226 may have a line shape, respectively, and may each be substantially parallel to the longitudinal side of the second wall 222. In addition, as shown in FIG. 2F, the notch 225 and the auxiliary notch 226 may have "L" shapes, and be bent one or more times to have a portion which is parallel to the longitudinal side of the second wall 222 and a portion which is parallel to the longitudinal side of the third wall 223. However, the shapes of the notch 225 and the auxiliary notch 226 constituting the safety vent of the present invention are not limited to the line shape or the bent line shape, but may include various bent shapes and curved shapes.

In this way, in the present invention, since the auxiliary notch 226 corresponding to the notch 225 is further provided in addition to the notch 225 formed on the inner surface 221_1 of the first wall 221 of the can 220, the can 220 may be easily destroyed under a low pressure. That is, in a condition that the safety vent may be easily destroyed under a low pressure due to the notch 225 formed on the inner surface 221_1, since the auxiliary notch 226 is further formed on a portion of the outer surface 221_2 corresponding to the notch 225, the safety vent may be more easily destroyed. Therefore, the safety and the reliability of the battery 200 are further improved.

Figure 3A:
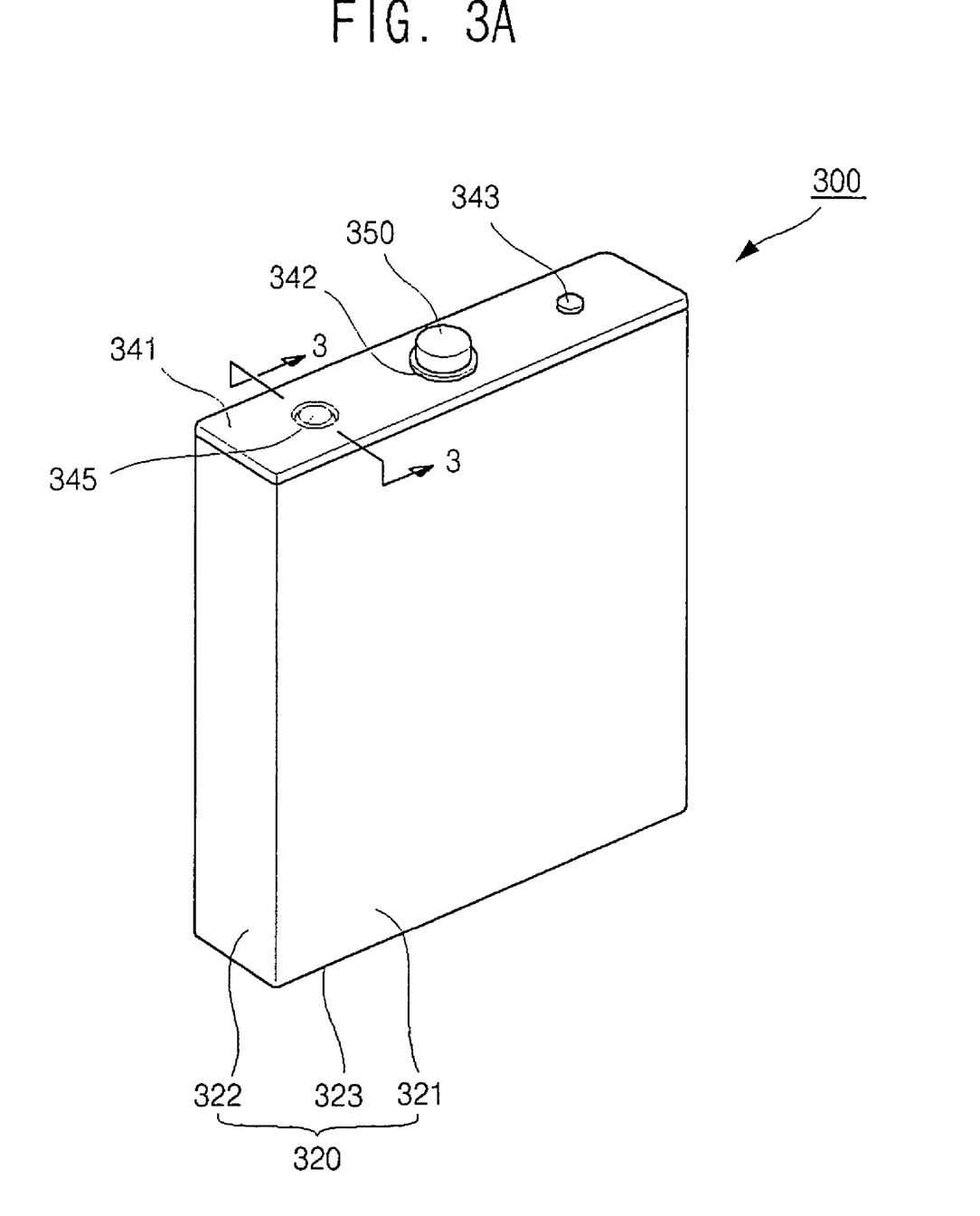
FIG. 3A is a perspective view illustrating a lithium ion secondary battery according another embodiment of the present invention, where the safety vent is formed in a cap plate.
Figure 3B:
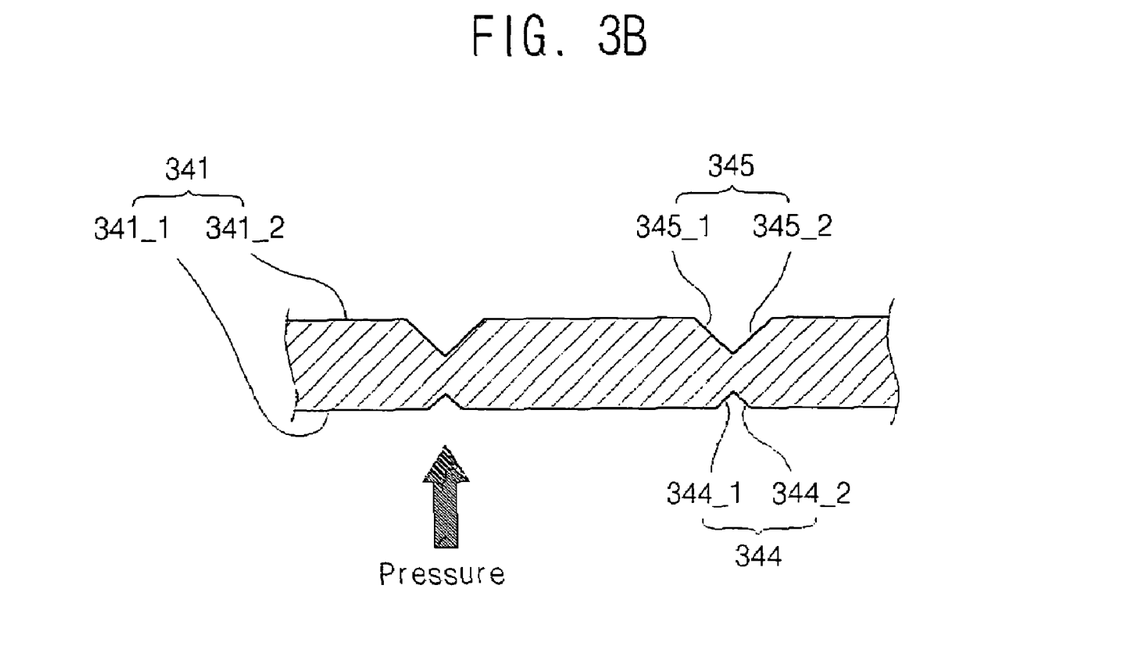
FIG. 3B is a cross-sectional view taken along a line 3-3 of FIG. 2A.
Figure 3C:
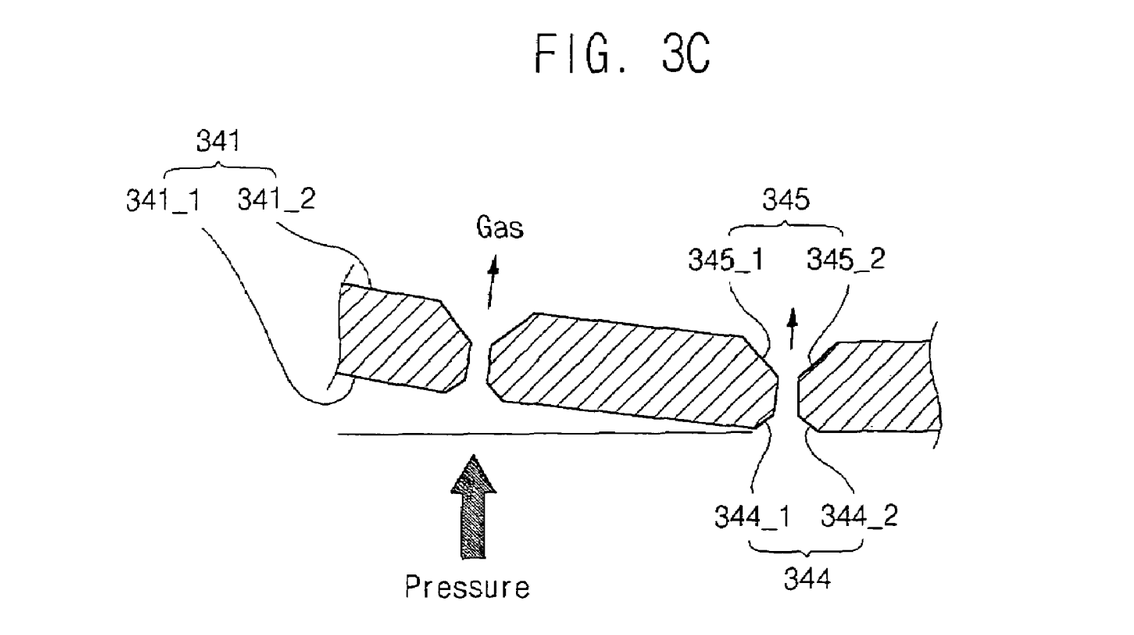
FIG. 3C is a cross-sectional view illustrating a state where the can is destroyed.

FIG. 3A is a perspective view illustrating a lithium ion secondary battery 300 according to yet another embodiment of the present invention, FIG. 3B is a cross-sectional view taken along a line 3-3 of FIG. 3A, and FIG. 3C is a cross-sectional view illustrating a state where the cap plate 341 is destroyed. Here, the lithium ion secondary battery 300 according to this embodiment of the present invention has a configuration similar to that of the aforementioned lithium ion secondary battery 100, and thus differences thereof will be emphasized.

Figure 3D:
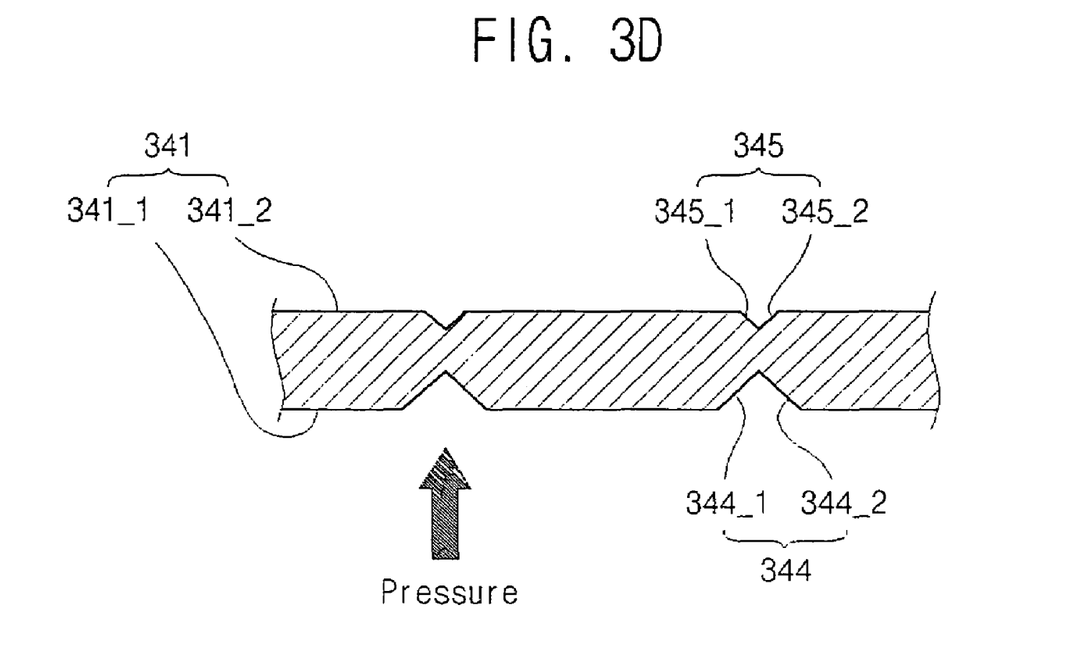
FIG. 3D is a partial cross-sectional view illustrating a safety vent according to another embodiment of the present invention, where the safety vent is formed in the cap plate.

As shown in the figures, in the lithium ion secondary battery 300 according to another embodiment of the present invention, the notch 344 for the safety vent is formed on an inner surface 341_1 of the cap plate 341 of the cap assembly, not the can 320. The lithium ion secondary battery 300 includes a pair of first walls 321, a third wall 321, a gasket 342, a plug 343, and a negative electrode terminal 350. The auxiliary notch 345 is further formed on an outer surface 341_2 of the cap plate 341 corresponding to the notch 344. The notch 344 is formed in a predetermined depth by pressing the inner surface 341_1 of the cap plate 341, and includes a first slant surface 344_1 and a second slant surface 344_2 forming a predetermined angle. In addition, the auxiliary notch 345 is formed in a predetermined depth by pressing the outer surface 341_2 of the cap plate 341, and includes a first slant surface 345_1 and a second slant surface 345_2 which form a predetermined angle. The notch 344 has a depth larger than that of the auxiliary notch 345, but the present invention is not limited to the depth. That is, as shown in FIG. 3D, the depth of the notch 344 may be larger than or equal to that of the auxiliary notch 345. In the figures, the notch 344 and the auxiliary notch 345 have almost a circle shape as seen from the upside thereof, but the present invention is not limited to the circle shape, and the shape of the notch or auxiliary notch may include an elliptical shape, a triangular shape, a pentagonal shape, etc.

On the other hand, when the swelling phenomenon occurs in the battery 300, the safety vent of the cap plate 341 having the notch 344 and the auxiliary notch 345 is destroyed, thereby discharging the internal gases of the can 320 outwardly. Here, when the swelling phenomenon occurs, the first walls 320 of the can 320 are expanded outwardly, but the second walls 322 and the third wall of the can 320 and the cap plate 341 are curved outwardly at both ends thereof and inwardly at the centers. Therefore, as shown in FIG. 3C, in a state where the cap plate 341 is slightly inclined so that one end is directed upwardly and the other end is directed downwardly, the notch 344 and the auxiliary notch 345 are destroyed.

As is described above, in the lithium ion secondary battery according to the present invention, since the notch for the safety vent is provided on the inner surface of the first walls which is expanded outwardly due to generation of the swelling phenomenon, the safety vent can be easily destroyed under a low pressure. That is, when the notch is formed on the inner surface, a thin wall portion remains only at the outermost side to which a tensile stress is applied, so that the portion can be most easily destroyed mechanically.

According to the present invention, an auxiliary notch may be formed on the outer surface, so that the safety vent can be more easily destroyed under a low pressure. That is, in a condition that the safety vent can be easily destroyed under a low pressure due to the notch formed on the inner surface, the auxiliary notch is further formed in a portion of the outer surface corresponding to the position of the notch, so that the safety vent is destroyed more easily.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A lithium ion secondary battery including an electrode assembly, which is formed of a positive electrode plate, a negative electrode plate and an isolation film, which are wound together, the lithium ion secondary battery further including a can, the can comprising:
   a pair of first walls having a plate shape, which are separated from each other by a predetermined distance;
   a pair of second walls having a plate shape, which have an area less than that of the pair of first walls and connect two longitudinal sides of the pair of first walls;
   a third wall having a plate shape, which has an area less than that of the pair of second walls and which is connected to both of the pair of first walls and the pair of second walls; and
   an opening, which is opposed to the third wall, to allow the electrode assembly to be coupled thereto;
   a cap assembly, welded to the pair of first walls and the pair of second walls, which closes the opening of the can and prevents the electrode assembly from being detached from the can, the cap assembly comprising a cap plate; and
   an electrolyte injected into the can through the cap plate, wherein a safety vent is obtained by forming a v-shaped notch and an auxiliary v-shaped notch on respective inner surfaces and outer surfaces of at least one of the first walls, the pair of second walls, the third wall and the cap plate, respectively, wherein the auxiliary v-shaped notch is formed at a surface opposite to a surface at which the v-shaped notch is formed, and a position at which the v-shaped notch is formed corresponds to a position at which the auxiliary v-shaped notch is formed such that a vertex of the v-shaped notch is aligned with a vertex of the auxiliary v-shaped notch.

2. The lithium ion secondary battery according to claim 1, wherein the safety vent is formed in a circle shape at the cap plate.

3. The lithium ion secondary battery according to claim 1, wherein the v-shaped notch is formed in a predetermined depth by pressing the inner surface of at least one of the first walls, the pair of second walls, the third wall and the cap plate, and the notch includes a first slant surface and a second slant surface forming a predetermined angle at the vertex of the v-shaped notch and wherein the auxiliary notch is formed in a predetermined depth by pressing the outer surface of at least one of the first walls, the pair of second walls, the third wall and the cap plate, and the auxiliary notch includes a first slant surface and a second slant surface forming a predetermined angle at the vertex of the auxiliary v-shaped notch.

4. The lithium ion secondary battery according to claim 2, wherein the v-shaped notch has a shallower depth than that of the auxiliary v-shaped notch.

5. The lithium ion secondary battery according to claim 3, wherein the v-shaped notch and the auxiliary v-shaped notch are formed at an inner surface and an outer surface, respectively of one of the pair of first walls.

6. The lithium ion secondary battery according to claim 1, wherein the v-shaped notch has a larger depth than that of the auxiliary v-shaped notch.

7. The lithium ion secondary battery according to claim 1, wherein the safety vent has a line shape which is parallel to a longitudinal side of the third wall of the can.

8. The lithium ion secondary battery according to claim 1, wherein the safety vent has a length which corresponds to 50% to 90% of a length of the longitudinal side of the third wall.

9. The lithium ion secondary battery according to claim 1, wherein the safety vent has a line shape which is parallel to a longitudinal side of the pair of second walls of the can.

10. The lithium ion secondary battery according to claim 1, wherein the safety vent has a length which corresponds to 50% to 90% of a length of the longitudinal side of the pair of second walls.

11. The lithium ion secondary battery according to claim 1, wherein the safety vent has a line shape which is bent one or more times such that a portion extends in a longitudinal direction of the pair of second walls and another portion extends in a longitudinal direction of the third wall.

\* \* \* \* \*